(12) United States Patent
Ge et al.

(10) Patent No.: US 9,018,845 B2
(45) Date of Patent: Apr. 28, 2015

(54) CIRCUIT FOR ADJUSTING LED CURRENT

(75) Inventors: Liang'an Ge, Hangzhou (CN); Xiaoli Yao, Hangzhou (CN)

(73) Assignee: Inventronics (Hangzhou), Inc., Hangzhou, Zhejiang (CN)

( * ) Notice: Subject to any disclaimer, the term of this patent is extended or adjusted under 35 U.S.C. 154(b) by 0 days.

(21) Appl. No.: 14/000,501

(22) PCT Filed: Jul. 21, 2011

(86) PCT No.: PCT/CN2011/077435
§ 371 (c)(1),
(2), (4) Date: Aug. 20, 2013

(87) PCT Pub. No.: WO2012/136030
PCT Pub. Date: Oct. 11, 2012

(65) Prior Publication Data
US 2014/0191670 A1 Jul. 10, 2014

(30) Foreign Application Priority Data
Apr. 2, 2011 (CN) .......................... 2011 1 0083757

(51) Int. Cl.
*H05B 37/00* (2006.01)
*H05B 39/00* (2006.01)
*H05B 41/00* (2006.01)
*H05B 33/08* (2006.01)

(52) U.S. Cl.
CPC ........ *H05B 33/0815* (2013.01); *H05B 33/0827* (2013.01); *H05B 33/0866* (2013.01)

(58) Field of Classification Search
None
See application file for complete search history.

(56) References Cited

U.S. PATENT DOCUMENTS

| 8,188,674 B2 | 5/2012 | Chung et al. |
| 8,674,621 B2 | 3/2014 | Ge et al. |

(Continued)

FOREIGN PATENT DOCUMENTS

| CN | 2826895 Y | 10/2006 |
| CN | 101674693 A | 3/2010 |

(Continued)

OTHER PUBLICATIONS

International Search Report (in Chinese with English translation) and Written Opinion (in Chinese) for PCT/CN2011/077435, mailed Nov. 3, 2011; ISA/CN.

(Continued)

*Primary Examiner* — Anh Tran
(74) *Attorney, Agent, or Firm* — Harness, Dickey & Pierce, P.L.C.

(57) ABSTRACT

Provided is a circuit for adjusting light-emitting diode (LED) current; the circuit comprises: a single-output constant current source (21), a multi-path LED output circuit (22) and a control bus (20) connected to the multi-path LED output circuit (22); any given LED output circuit comprises: a load circuit (23), an adjustment circuit (24), a current regulation circuit (25) and an adjustment control circuit (26). The circuit for adjusting LED current provided in the technical solution of the present invention adjusts the current of each LED output circuit via the load circuit, the adjustment circuit, the current regulation circuit and the adjustment control circuit, thus adjusting characteristic parameters such as color, color temperature, color rendering index, brightness and the like of the LED light source, thereby avoiding the problem of high cost caused by using multi-path constant current DC/DC circuit to adjust the current of each path.

18 Claims, 12 Drawing Sheets

(56) References Cited

U.S. PATENT DOCUMENTS

| | | |
|---|---|---|
| 2006/0108933 A1 | 5/2006 | Chen |
| 2009/0212716 A1 | 8/2009 | Chen et al. |
| 2009/0212717 A1 | 8/2009 | Trattler |
| 2010/0164403 A1* | 7/2010 | Liu .............................. 315/297 |
| 2010/0327758 A1 | 12/2010 | Chung et al. |

FOREIGN PATENT DOCUMENTS

| | | | |
|---|---|---|---|
| CN | 101702849 A | * | 5/2010 |
| CN | 101702849 A | | 5/2010 |
| CN | 201550320 U | | 8/2010 |
| CN | 201557302 U | | 8/2010 |
| CN | 101929632 A | | 12/2010 |
| CN | 201781658 U | | 3/2011 |
| CN | 201967183 U | | 9/2011 |

OTHER PUBLICATIONS

First Chinese Office Action regarding Application No. 201110083757.8, dated Feb. 7, 2014. Partial translation provided by Unitalen Attorneys at Law.

* cited by examiner

CIRCUIT FOR ADJUSTING LED CURRENT

This application is a 371 U.S. National Stage of International Application No. PCT/CN2011/077435, filed on Jul. 21, 2011, and claims priority to Chinese patent application No. 201110083757.8, titled "CIRCUIT FOR ADJUSTING LED CURRENT". filed with the State Intellectual Property Office on Apr. 2, 2011.The entire disclosures of the above applications are hereby incorporated by reference in their entirety.

FIELD OF THE INVENTION

The present invention relates to the field of electrical equipment, and particularly to a circuit for adjusting current of a LED.

BACKGROUND OF THE INVENTION

Color temperature of a light source is a temperature of an ideal black body when the ideal black body radiates at a certain temperature a light with the same color as that of a light emitted by the light source. The bluer the light color is, the higher the color temperature is; and the redder the light color is, the lower the color temperature is. The color temperature below 3300K gives people a sedate atmosphere and a feeling of warmth; the intermediate color temperature between 3000K and 5000K gives people a feeling of refreshment; and the color temperature above 5000K gives people a feeling of cold. Different application scenarios may require light sources with different color temperatures.

The conventional technical solution is to use a constant-voltage module together with multiple constant-current Direct-Current to Direct-Current (DC/DC) power supply circuits to adjust current of each load branch. As shown in FIG. 1, the DC/DC constant-current circuit may be a high frequency conversion circuit. Output of the constant-voltage module is used as input of the multiple constant-current circuits. Each DC/DC constant-current circuit performs constant-current control independently, and the value of output current of each load branch can be set independently as required, so as to adjust brightness of light-emitting diodes (LEDs) with different colors or different color temperatures, and thereby achieves adjustment for color or color temperature of a light source.

In the above solution, since each circuit for adjusting current of a LED needs one separate constant-current DC/DC circuit, the cost is high.

SUMMARY OF THE INVENTION

In view of this, the present invention provides a circuit for adjusting current of a LED, and the specific solution is as follows.

The circuit for adjusting current of a LED includes: a single-output constant current source, multiple LED output circuits and a control bus connected with the multiple LED output circuits, each of the multiple LED output circuits including a load circuit, an adjustment circuit, a current regulation circuit and an adjustment control circuit.

The load circuit includes multiple LEDs connected in series, one terminal of the load circuit is connected with a first output terminal of the single-output constant current source, and the other terminal of the load circuit is connected with an input terminal of the adjustment circuit.

The adjustment circuit includes an regulator connected with the load circuit and a current sampling circuit, one terminal of the current sampling circuit is connected with the regulator, and the other terminal of the current sampling circuit is connected with a second output terminal of the single-output constant current source, and an output terminal of the adjustment circuit is connected with an input terminal of the current regulation circuit.

An output terminal of the current regulation circuit is connected with a first input terminal of the adjustment control circuit, and the current regulation circuit makes, as required, some adjustments to sampled-current output from the adjustment circuit such that the sampled-current is converted into a control signal corresponding to the sampled-current, and the control signal is inputted into the adjustment control circuit.

A second input terminal of the adjustment control circuit is connected with the control bus and an output terminal of the adjustment control circuit is connected with the regulator, the adjustment control circuit compares the control signal with a voltage of the control bus, and adjusts impedance of the regulator according to the comparison result, so as to achieve adjustment for current of this LED output circuit.

Preferably, the current sampling circuit is a first adjustable resistor Rs1, and the current regulation circuit is a wire connected with the first adjustable resistor Rs1.

Preferably, the current sampling circuit is a first resistor R1.

Preferably, the current regulation circuit includes a second resistor R2, one terminal of the second resistor R2 is connected with the output terminal of the adjustment circuit, and the other terminal of the second resistor R2 is connected with a first switch S1 and an input terminal of a filter circuit respectively, the other terminal of the first switch S1 is connected to ground, the first switch S1 is turned on or off under the control of a pulse signal, and an output terminal of the filter circuit is connected with an input terminal of the adjustment control circuit.

Preferably, the filter circuit includes a third resistor R3, a fourth resistor R4, a first capacitor C1, a first operational amplifier U1 and a second capacitor C2. Specifically, one terminal of the third resistor R3 is connected with the second resistor R2, the other terminal of the third resistor R3 is connected with the first capacitor C1 and the fourth resistor R4 respectively; the other terminal of the capacitor C1 is connected with an inverting input terminal of the first operational amplifier U1; the other terminal of the fourth resistor R4 is connected with a non-inverting input terminal of the first operational amplifier U1; the non-inverting input terminal of the first operational amplifier U1 and the fourth resistor R4 are connected to ground via the second capacitor; the inverting input terminal of the first operational amplifier U1 is connected with an output terminal thereof; and the output terminal of the first operational amplifier U1 is connected with the input terminal of the adjustment control circuit.

Preferably, the adjustment control circuit includes a fifth resistor R5, a second operational amplifier U2 and a compensation network.

One terminal of the fifth resistor R5 is connected with an output terminal of the current regulation circuit, and the other terminal of the fifth resistor R5 is connected with the control bus.

An inverting input terminal of the second operational amplifier U2 is connected with an output terminal of the current regulation circuit, and the non-inverting input terminal of the second operational amplifier U2 is connected with the control bus.

The compensation network is connected in parallel between the inverting output terminal and an output terminal of the second operational amplifier U2.

The output terminal of the second operational amplifier U2 is connected with the regulator.

Preferably, the current regulation circuit includes a sixth resistor R6 and a second adjustable resistor Rs2.

One terminal of the sixth resistor R6 is connected with a high level terminal of the first resistor R1, and the other terminal of the sixth resistor R6 is connected with an input terminal of the adjustment control circuit.

One terminal of the second adjustable resistor Rs2 is connected with an input terminal of the adjustment control circuit, and the other terminal of the second adjustable resistor Rs2 is connected with a low level terminal of the first resistor R1.

Preferably, the current regulation circuit further includes an impedance matching circuit, the impedance matching circuit is a voltage follower consisting of an operational amplifier. An inverting input terminal of the operational amplifier is connected with an output terminal thereof, a non-inverting input terminal of the operational amplifier is connected to a common connection point of the sixth resistor R6 and the second adjustable resistor Rs2, and the output terminal of the operational amplifier is connected with an input terminal of the adjustment control circuit.

Preferably, the adjustment control circuit includes an eighth resistor R8, a ninth resistor R9, a tenth resistor R10, a diode D1, a fourth operational amplifier U4, a fifth operational amplifier U5 and a compensation network.

One terminal of the eighth resistor R8 is connected with an output terminal of the current regulation circuit, and the other terminal of the eighth resistor R8 is connected with an inverting input terminal of the fourth operational amplifier U4.

One terminal of the ninth resistor R9 is connected with a non-inverting input terminal of the fourth operational amplifier U4, and the other terminal of the ninth resistor R9 is connected with a power supply Vcc.

The non-inverting input terminal of the fourth operational amplifier U4 is connected with the control bus via the tenth resistor R10.

The compensation network is connected in parallel between the inverting input terminal and an output terminal of the fourth operational amplifier U4.

The output terminal of the fourth operational amplifier U4 is connected with the regulator.

A non-inverting input terminal of the fifth operational amplifier U5 is connected with an output terminal of the current regulation circuit.

An inverting input terminal of the fifth operational amplifier U5 is connected with the control bus.

An anode of the diode D1 is connected to the inverting input terminal of the fifth operational amplifier U5, and a cathode of the diode D1 is connected to an output terminal of the fifth operational amplifier U5.

Preferably, the regulator is an n-channel enhancement-mode MOS (metal oxide semiconductor) transistor. A drain of the MOS transistor is connected with the load circuit, a source of the MOS transistor is connected with an input terminal of the current sampling circuit, and a grid of the MOS transistor is connected with an output terminal of the adjustment control circuit.

Preferably, in the case where the regulator is a first NPN transistor Qn1, a collector of the Qn1 is connected with the load circuit, an emitter of the Qn1 is connected with an input terminal of the current sampling circuit, and a base of the Qn1 is connected with an output terminal of the adjustment control circuit; and the adjustment control circuit further includes an eleventh resistor R11 connected between an output terminal of a third operational amplifier U3 and the base of the first NPN transistor Qn1.

In the case where the regulator is a first PNP transistor Qp1, an emitter of the Qp1 is connected with the load circuit, a collector of the Qp1 is connected with an input terminal of the current sampling circuit, and a base of the Qp1 is connected with an output terminal of the adjustment control circuit; and the adjustment control circuit further includes a twelfth resistor R12 and a second NPN transistor Qn2, one terminal of the twelfth resistor R12 is connected to an output terminal of the third operational amplifier U3 and the other terminal of the twelfth resistor R12 is connected to a base of the second NPN transistor Qn2, a collector of the second NPN transistor Qn2 is connected with the base of the first PNP transistor Qp1, and an emitter of the second NPN transistor Qn2 is connected to ground.

Preferably, in the case where the regulator is a third NPN transistor Qn3, a collector of the Qn3 is connected with the load circuit, an emitter of the Qn3 is connected with an input terminal of the current sampling circuit, and a base of the third NPN transistor Qn3 is connected with an output terminal of the adjustment control circuit; and the adjustment control circuit further includes an thirteenth resistor R13 connected between an output terminal of the fourth operational amplifier U4 and the base of the third NPN transistor Qn3.

In the case where the regulator is a second PNP transistor Qp2, an emitter of the Qp2 is connected with the load circuit, a collector of the Qp2 is connected with an input terminal of the current sampling circuit, and a base of the Qp2 is connected with an output terminal of the adjustment control circuit; and the adjustment control circuit further includes a fourteenth resistor R14 and a fourth NPN transistor Qn4, one terminal of the fourteenth resistor R14 is connected to an output terminal of the fourth operational amplifier U4 and the other terminal of the fourteenth resistor R14 is connected to a base of the fourth NPN transistor Qn4, a collector of the fourth NPN transistor Qn4 is connected with the base of the second PNP transistor Qp2, and an emitter of the fourth NPN transistor Qn4 is connected to ground.

Preferably, the control bus is connected with the power supply Vcc via a resistor R.

Preferably, in the multiple LED output circuits, LED lamps in different LED output circuits are LED lamps with different colors or white light LED lamps with different color temperatures.

Preferably, output current of the single-output constant current source is adjustable, and brightness of a light source consisting of the LEDs changes as the output current of the single-output constant current source changes.

It can be seen from the above solution that, the circuit for adjusting current of a LED disclosed by the present invention adjusts the current of each of the multiple LED output circuits by the load circuit, the adjustment circuit, the current regulation circuit and the adjustment control circuit, to achieve adjustment for characteristic parameters, such as color, color temperature, color rendering index and brightness, of the LED light source, which can avoid the problem of high cost caused by using constant-current DC/DC circuits to adjust the current.

BRIEF DESCRIPTION OF THE DRAWINGS

To illustrate the technical solution in embodiments of the present invention or in the prior art more clearly, the accompanying drawings to be used in the description of the embodiments or the prior art will be simply introduced below. Obviously, the accompanying drawings in the following description are just some embodiments of the present invention, and other accompanying drawings can be obtained by those skilled in the art according to these accompanying drawings without any creative work.

FIG. 1 is a schematic diagram showing a structure of a circuit for adjusting current of a LED in the prior art.

DETAILED DESCRIPTION OF THE INVENTION

Next, the technical solution of the embodiments of the present invent will be clearly and completely described in combination with the accompanying drawings used in the embodiments of the present invention. Obviously, the described embodiments are just a part of embodiments of the present invention, rather than all embodiments. All other embodiments obtained by those skilled in the art based on the embodiments of the present invention without any creative work will fall within the scope of protection of the present invention.

Figure 1:
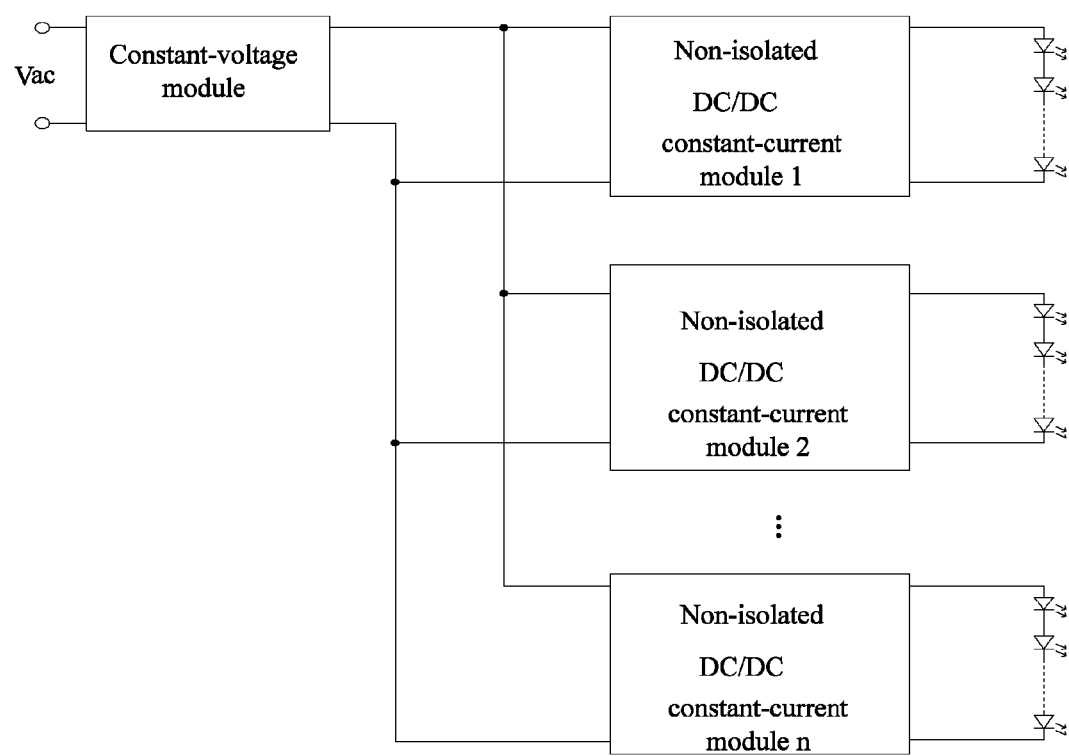
Figure 2:
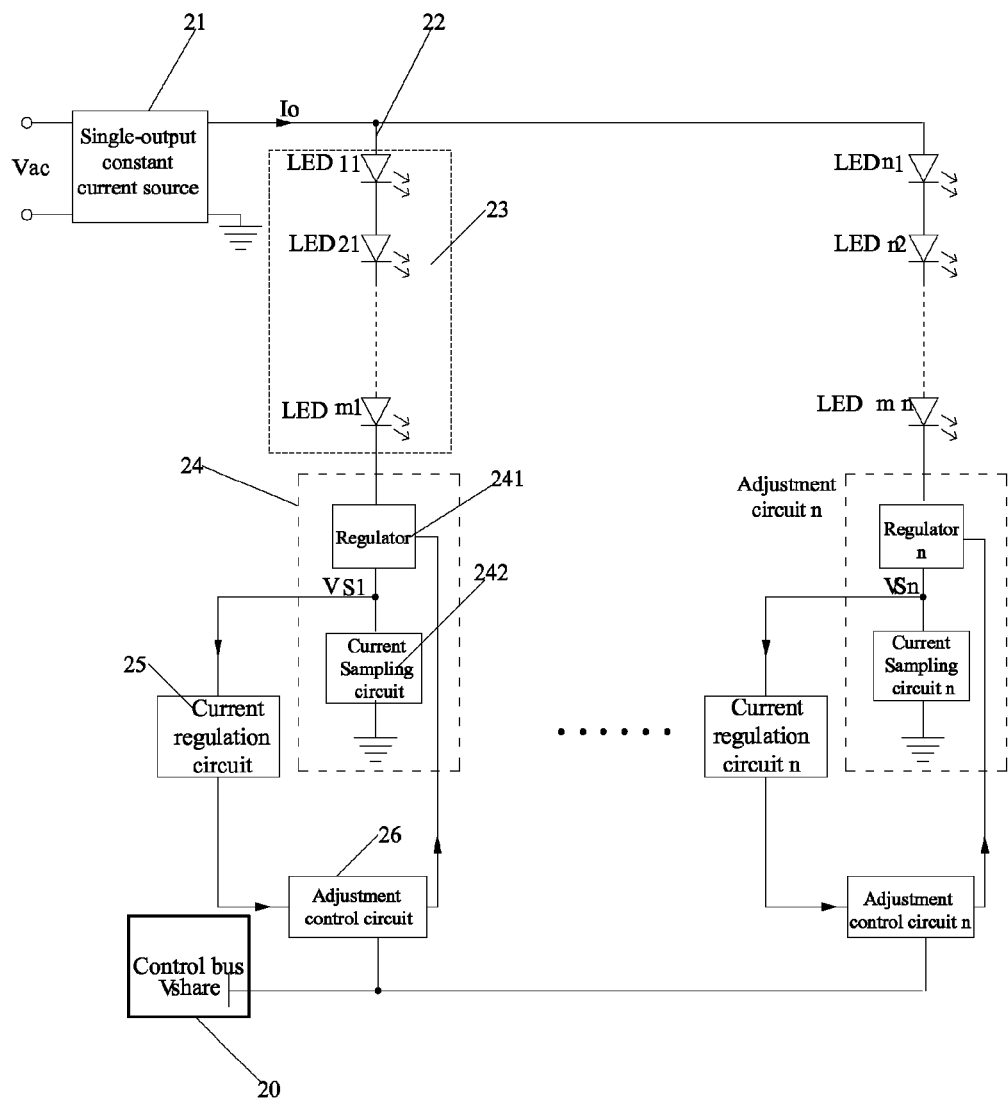
FIG. 2 is a schematic diagram showing a structure of a circuit for adjusting current of a LED according to an embodiment of the present invention.

The present invention discloses a circuit for adjusting circuit of a LED, the specific structure of which is shown in FIG. 2, including: a single-output constant current source 21, multiple LED output circuits 22 and a control bus 20. Specifically, input terminals of the LED output circuit are connected with the single-output constant current source, the control bus 20 is connected with the multiple LED output circuits. In this embodiment, the multiple LED output circuits have the same structure, and therefore, a first LED output circuit in the multiple LED output circuits is taken as an example to analyze the structure thereof, which includes a load circuit 23, an adjustment circuit 24, a current regulation circuit 25 and an adjustment control circuit 26.

The load circuit 23 includes multiple LEDs connected in series, one terminal of the load circuit 23 is connected with a first output terminal of the single-output constant current source 21, and the other terminal of the load circuit 23 is connected with an input terminal of the adjustment circuit 24.

The adjustment circuit 24 includes a regulator 241 connected with the load circuit 23 and a current sampling circuit 242, one terminal of the current sampling circuit 242 is connected with the regulator 241, and the other terminal of the current sampling circuit 242 is connected with a second output terminal of the single-output constant current source 21, the second output terminal of the single-output constant current source 21 is a reference ground with a zero level.

An output terminal of the adjustment circuit 24 is connected with an input terminal of the current regulation circuit 25.

An output terminal of the current regulation circuit 25 is connected with a first input terminal of the adjustment control circuit 26, the current regulation circuit 25 makes, as required, some adjustments to sampled-current output from the adjustment circuit 24 such that the sampled-current is converted into a control signal corresponding to the sampled-current, and the control signal is inputted into the adjustment control circuit 26.

A second input terminal of the adjustment control circuit 26 is connected with the control bus 20, and an output terminal of the adjustment control circuit 26 is connected with the regulator 241. The adjustment control circuit 26 compares the control signal with a total control signal Vshare of the control bus, and adjusts impedance of the regulator 241 according to the comparison result, so as to achieve adjustment for current of this LED output circuit.

In this embodiment, the regulator 241 may be a MOS transistor, and may also be a PNP transistor or an NPN transistor.

In the case where the regulator 241 is an n-channel enhancement-mode MOS transistor, a drain of the MOS transistor is connected with the load circuit 23, a source of the MOS transistor is connected with an input terminal of the current sampling circuit 242, and a grid of the MOS transistor is connected with an output terminal of the adjustment control circuit 26.

In the case where the regulator 241 is a PNP transistor, an emitter of the PNP transistor is connected with the load circuit 23, a collector of the PNP transistor is connected with the current sampling circuit 242, and a base of the PNP transistor is connected with an output terminal of the adjustment control circuit 26.

In the case where the regulator 241 is an NPN transistor, a collector of the NPN transistor is connected with the load circuit 23, an emitter of the NPN transistor is connected with the current sampling circuit 242, and a base of the NPN transistor is connected with an output terminal of the adjustment control circuit 26.

In this embodiment, the total control signal Vshare on the control bus is provided under the common action of the multiple LED output circuits. Further, the control bus can also be connected with a power supply Vcc via a resistor R, thereby the Vshare is obtained under the common action of the power supply Vcc and the multiple LED output circuits.

In the multiple LED output circuits of this embodiment, LEDs in different LED output circuits may be LEDs with different colors, such as red LEDs, green LEDs, and blue LEDs, or may also be LEDs with different color temperatures, such as cool white LEDs and warm white LEDs. Current distribution ratio of the individual LED output circuits is jointly decided by the adjustment circuits, the current regulation circuits and the adjustment control circuits of the individual LED output circuits. By adjusting the current distribution ratio of individual LED output circuits, it is able to achieve adjustment for color or color temperature of a light source consisting of LEDs in the multiple LED output circuits. For example, it is assumed that there are two LED output circuits, one is a warm white LED, the other is a cool-white LED, then color temperature of a light source consisting of the two LED can be adjusted by adjusting the current distribution ratios of the two LED output circuits.

In a specific situation, the type of LED light source in different LED output circuits is selected according to practical application scenarios.

In this embodiment, the output current of the single-output constant current source 21 is adjustable. That is, the total current of the multiple LED output circuits is variable. Therefore, brightness of a light source consisting of LEDs in the multiple LED output circuits can be adjusted by adjusting current of the single-output constant current source 21.

The circuit for adjusting current of LEDs disclosed by the embodiment adjusts the current of each of the multiple LED output circuits by the load circuit, the adjustment circuit, the current regulation circuit and the adjustment control circuit, to achieve adjustment for characteristic parameters, such as color, color temperature, color rendering index and brightness, of the LED light source, which can avoid the problem of high cost caused by using multiple constant-current DC/DC circuits to adjust the current. Also, the present invention can achieve independent adjustment for brightness, color or color temperature of the LED light source, thereby making the control to be simpler.

Figure 3:
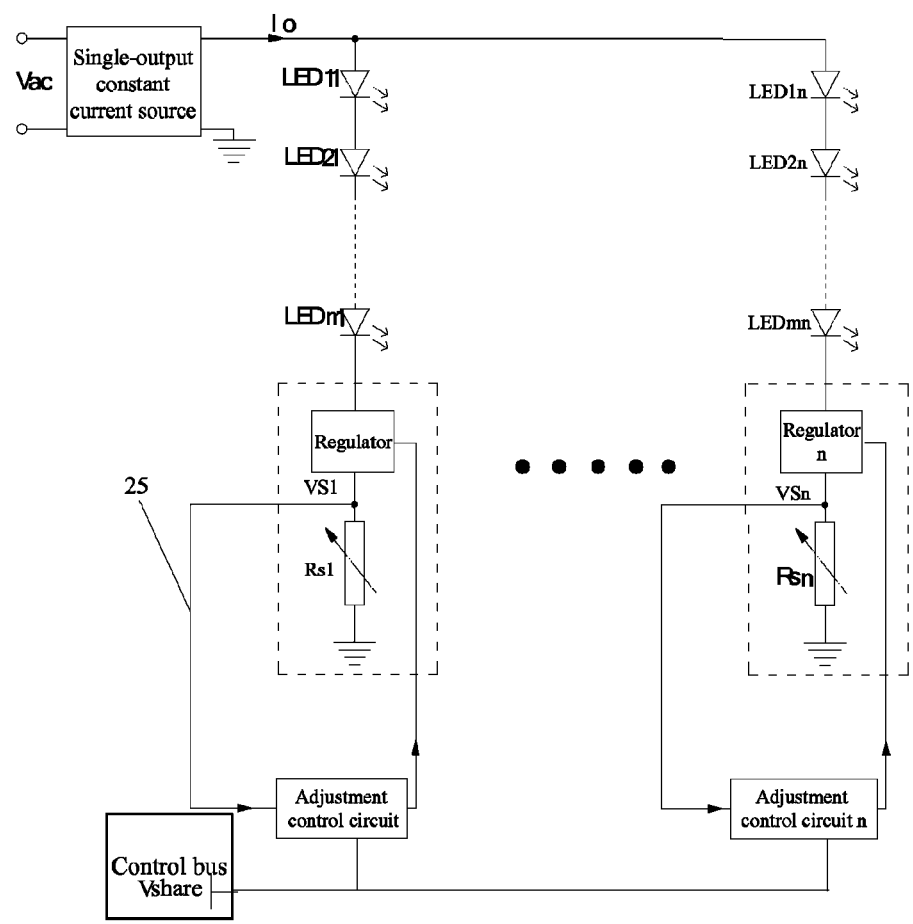
FIG. 3 is a schematic diagram showing yet another structure of the circuit for adjusting current of a LED according to an embodiment of the present invention.

In the circuit disclosed in this embodiment, the current sampling circuit can be implemented in various forms. For example, as shown in FIG. 3, the current sampling circuit is a first adjustable resistor Rs1, and the function of adjusting current of this LED output circuit can be achieved by adjusting resistance of Rs1. Therefore, in this case, the first adjustable resistor Rs1 can not only be used as a sampling resistor in the current sampling circuit to perform a current sampling function, but also perform a current adjustment function in the current regulation circuit. So in the case, the current regulation circuit 25 may be simplified as a wire connected with the first adjustable resistor Rs1, but the current regulation circuit 25 is not limited to be a wire, and it may be any current regulation circuit structure described below. The operating principle of adjusting current is illustrated by taking the first LED output circuit as an example: in order to reduce the current output from this LED output circuit, as long as resistance of a first slide rheostat Rs1 is increased, the current sampling signal Vs1 in this LED output circuit will increase; and after Vs1 and the total control signal Vshare are compared in the adjustment control circuit, the impedance of the regulator will increase under the control of a output signal, thereby reducing current in this LED output circuit.

The adjustable resistor in this embodiment may be a slide rheostat, or other circuits that can achieve adjustable resistance.

In this embodiment, there is no limitation for all the current sampling circuits in the multiple LED output circuits to be an adjustable resistor. For example, the current sampling circuits in several LED output circuits of the multiple LED output circuits may be adjustable resistors, while the current sampling circuits in the remaining LED output circuits may be fixed resistors.

Figure 4:
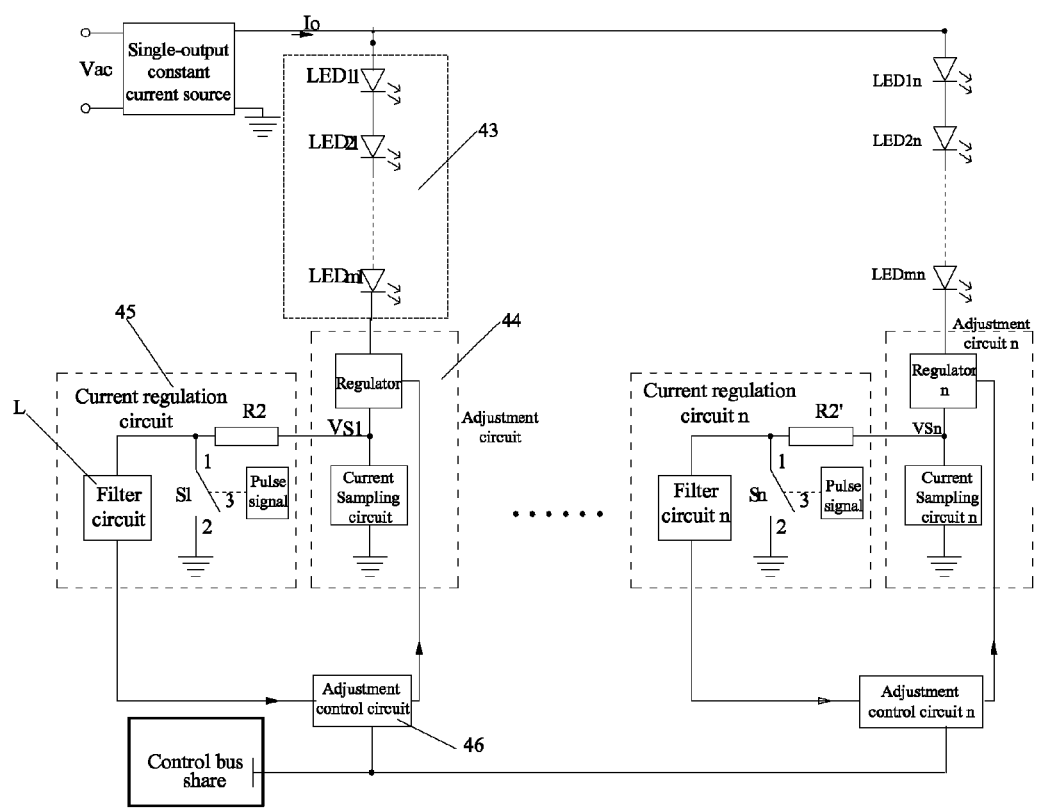
FIG. 4 is a schematic diagram showing yet another structure of the circuit for adjusting current of a LED according to an embodiment of the present invention.

FIG. 4 is a schematic diagram showing yet another structure of the circuit for adjusting current of a LED according to an embodiment of the present invention, the basic structure of which is the same as that of the circuit shown in FIG. 2, including: a load circuit 43, an adjustment circuit 44, a current regulation circuit 45 and an adjustment control circuit 46. In this embodiment, the current regulation circuit 45 includes a second resistor R2, and one terminal of the second resistor R2 is connected with an output terminal of the adjustment circuit 44, the other terminal of the second resistor R2 is connected with one terminal of a first switch S1 and an input terminal of a filter circuit L respectively, the other terminal of the first switch S1 is connected to ground, the first switch S1 is turned on or off under the control of a pulse signal, and an output terminal of the filter circuit L is connected with an input terminal of the adjustment control circuit 46.

Due to the turning on and off of the switch S1, the current sampling signal Vs1 is converted into a pulse level signal from the original level signal, and the pulse level signal is input to the filter circuit L, the filter circuit L performs filtering to the pulse level signal to obtain a filtered level signal, and the amplitude of the filtered level signal is an average value of the pulse level signal; then the average value is output to the adjustment control circuit to be compared with the total control signal Vshare inside the adjustment control circuit; then a signal obtained after the comparison is output to the adjustment circuit to control the impedance of the regulator, thereby achieving adjustment for current of each LED output circuit, and achieving adjustment for characteristic parameters of the LED light source, such as color, color temperature and color rendering index.

Figure 5:
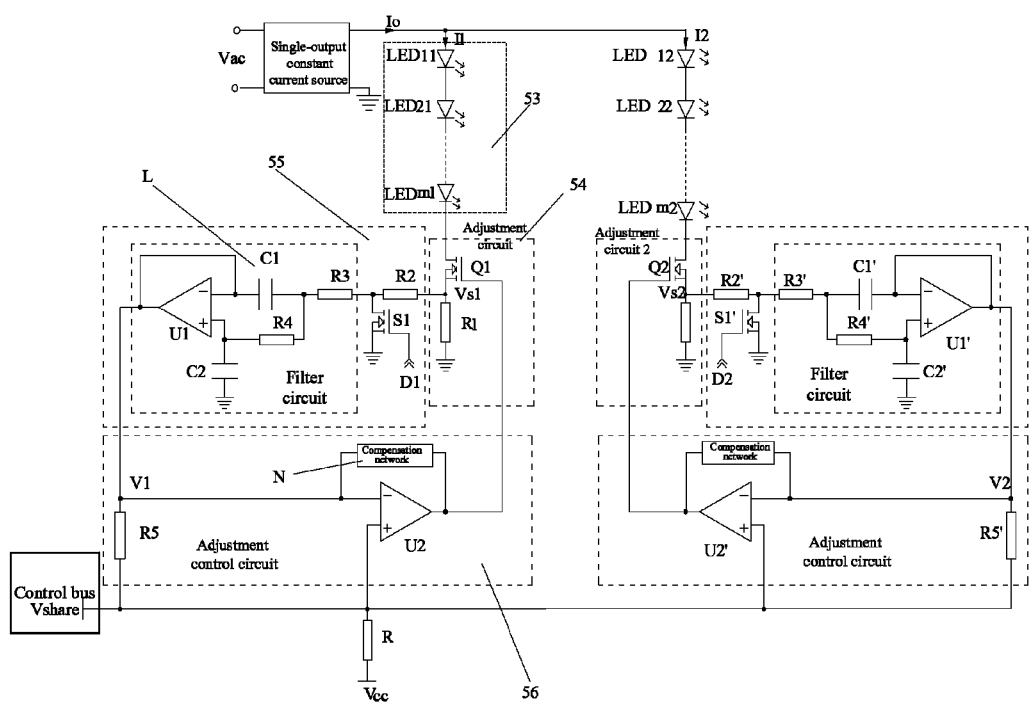
FIG. 5 is a schematic diagram showing yet another structure of the circuit for adjusting current of a LED according to an embodiment of the present invention.

Further, a schematic diagram showing yet another structure of the circuit for adjusting current of a LED according to the present invention is shown in FIG. 5. This embodiment takes a case of two LED output circuits having the same structure as an example, and the basic structure of each of the two LED output circuits is similar to the structure shown in FIG. 4, which includes a load circuit 53, an adjustment circuit 54, a current regulation circuit 55 and an adjustment control circuit 56. In this embodiment, the current sampling circuit is a first resistor R1, and in this case, a high level terminal of the first resistor R1 is an output terminal of the adjustment circuit 54, and both the switch S1 and the adjustment resistor are n-channel enhancement-mode MOS transistors.

As shown in the Figure, the structure of the filter circuit L in this embodiment includes a third resistor R3, a fourth resistor R4, a first capacitor C1, a first operational amplifier U1 and a second capacitor C2. Specifically, one terminal of the third resistor R3 is connected with the second resistor R2, the other terminal of the third resistor R3 is connected with the first capacitor C1 and the fourth resistor R4 respectively; the other terminal of the capacitor C1 is connected with an inverting input terminal of the first operational amplifier U1; the other terminal of the fourth resistor R4 is connected with a non-inverting input terminal of the first operational amplifier U1; and the non-inverting input terminal of the first operational amplifier U1 and the fourth resistor R4 are connected to ground via the second capacitor C2, an output terminal of the first operational amplifier U1 is connected with the inverting input terminal of the first operational amplifier U1, and the output terminal of the first operational amplifier U1 is connected with an input terminal of the adjustment control circuit.

In this embodiment, the structure of the filter circuit is not limited to that shown above, all circuits which can filter a pulse level signal generated by the switch S1 under the control of a pulse signal to obtain an average value are within the scope of protection of this embodiment. Moreover, in this embodiment, the switch is not limited to an n-channel enhancement-mode MOS transistor, it may be a transistor.

Further, the adjustment control circuit 56 in this embodiment includes a fifth resistor R5, a second operational amplifier U2 and a compensation network, and the compensation network is usually formed of a resistor and a capacitor connected in series.

One terminal of the fifth resistor R5 is connected with the output terminal of the first operational amplifier U1, and the other terminal of the fifth resistor R5 is connected with the control bus; an inverting input terminal of the second operational amplifier U2 is connected with the output terminal of the first operational amplifier U1, and the non-inverting input terminal of the second operational amplifier U2 is connected with the control bus; the compensation network is connected in parallel between the inverting input terminal and an output terminal of the second operational amplifier U2; and the output terminal of the second operational amplifier U2 is connected with the regulator.

The principle of this circuit is shown as follows.

The control bus is connected to Vcc via a resistor R. Current I1 and I2 of the two LED output circuits satisfy the following equation:

$$I1 \times R1 \times D1 = I2 \times R1' \times D2 \quad (1)$$

where D1 is the duty ratio of a pulse signal which controls the turning on or off of the switch S1 in a first LED output circuit in the two LED output circuits, and D2 is the duty ratio of a pulse signal which controls the turning on or off of the switch S1' in a second LED output circuit in the two LED output circuits. Therefore, after the resistance of the first resistor R1 in the first LED output circuit and the resistance of the first resistor R1' in the second LED output circuit are determined, when there is a need to adjust the ratio for currents of the two LED output circuits, it just needs to adjust the duty ratios of the pulse signals of the two LED output circuits. The specific adjustment way may be to adjust the duty ratio of the pulse signal of only one LED output circuit, or may be to adjust the duty ratios of the pulse signals of both the two LED output circuits.

For example, warm white LEDs are selected for LEDs in the first LED output circuit, and cool white LEDs are selected for LEDs in the second LED output circuit; assuming that the duty ratio D1 of the pulse signal which controls the turning on or off of the switch S1 in the first LED output circuit is set as D1=0.5, and the duty ratio D2 of the pulse signal which controls the turning on or off of the switch S1' in the second LED output circuit is set as D2=1; and assuming that the value of the resistor in the current sampling circuit in the first LED output circuit and the value of the resistor in the current sampling circuit in the second LED output circuit are the same, i.e., R1=R1'; then I1=2×I2 is obtained from the equation (1). Therefore, the color temperature of the LED light source consisting of the warm white LEDs and the cool white LEDs is between the color temperature of the warm white LEDs and the color temperature of the cool white LEDs.

The magnitude of the total control signal Vshare is determined by output voltages V1 and V2 of the two LED output circuits. The value of the total control signal is calculated as follows:

$$Vshare = \frac{V1 \times R5' + V2 \times R5}{R5 + R5'} \quad (2)$$

The resistance of the fifth resistor R5 in the first LED output circuit may be equal or not equal to the resistance of the fifth resistor R5' in the second LED output circuit.

The total control signal Vshare is compared with the output signals (V1, V2) of the first LED output circuit and the second LED output circuit respectively, and if in the two LED output circuits there is one LED output circuit in which the output signal of its current regulation circuit is smaller than the total control signal Vshare, then output voltage of the operational amplifier increases to reduce on-impedance of the regulator, and when another LED output circuit having larger current is adjusted to gradually reduce the current thereof, the current of this LED output circuit automatically and gradually increases until it is close to an average current (which is the current of a certain LED output circuit when the output signal of the current regulation circuit in this LED output circuit is equal to the total control signal Vshare); and if the output signal of the current regulation circuit in a certain LED output circuit is larger than the total control signal Vshare, then the output voltage of the operational amplifier gradually decreases to increase the on-impedance of the regulator in this LED output circuit, and the LED current gradually decreases until it is close to the average current. When the current in each LED output circuit reaches a stable state after adjustment, due to a biasing effect of the resistor R, the voltage of the non-inverting input terminal of the operational amplifier is always slightly larger than the voltage of the inverting input terminal of the operational amplifier, thereby the voltage of the output terminal of the operational amplifier is raised, and the regulator in the LED output circuit having the largest voltage drop of LED load is in a saturated conduction state, and at this time, the output voltage of the single-output constant current source is equal to or close to the voltage drop of LED load in this LED output circuit, and impedances of the regulators in other LED output circuits is also reduced. Therefore, in the case where the control bus Vshare is connected to Vcc via the biasing resistor R, power consumption of the adjustment resistor in each LED output circuit is reduced, thereby improving efficiency of this embodiment.

In this embodiment, the number of the LED output circuits is not limited to two, there may be more LED output circuits. According to the specific number of the LED output circuits, the equation described above can be adjusted correspondingly to achieve the purpose of determining the control signal Vshare according to all LED output circuits. For example, In the case where there are 3 LED output circuits, the total control signal Vshare is calculated as follows:

$$Vshare = \frac{\frac{V1}{R5} + \frac{V2}{R5'} + \frac{V3}{R5''}}{\frac{1}{R5} + \frac{1}{R5'} + \frac{1}{R5''}} \quad (3)$$

Also, in this embodiment, there is no limitation for each of the LED output circuits to have the same current regulation circuit and the same adjustment control circuit, they may have different combination forms for the current regulation circuit and the adjustment control circuit.

Figure 6:
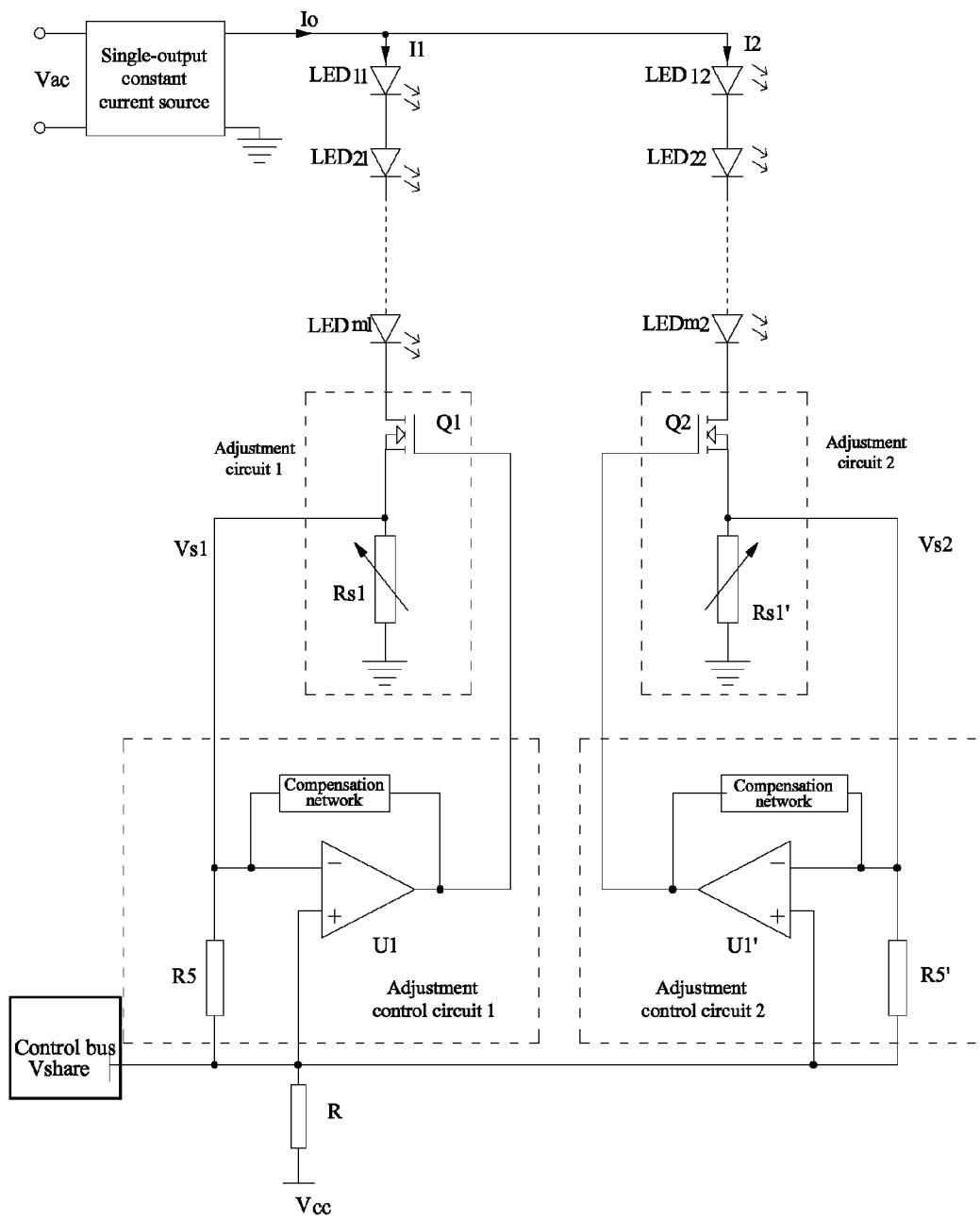
FIG. 6 is a schematic diagram showing yet another structure of the circuit for adjusting current of a LED according to an embodiment of the present invention.

In this embodiment, the above structure of the adjustment control circuit is not limited to be applicable just for a case that the current sampling circuit is the first resistor R1, it may also be applied to a circuit in which the current sampling circuit is a first slide rheostat Rs1, the structure of which is shown in FIG. 6.

Similarly, the structure of the adjustment control circuit disclosed by this embodiment may be applied to any type of current regulation circuit, as long as it is ensured that when connecting, one terminal of the fifth resistor R5 is connected with the output terminal of the current regulation circuit, and the other terminal of the fifth resistor R5 is connected the control bus; the inverting input terminal of the second operational amplifier U2 is connected with the output terminal of the current regulation circuit, and the non-inverting input terminal of the second operational amplifier U2 is connected with the control bus; the compensation network is connected in parallel between the inverting input terminal and the output terminal of the second operational amplifier U2; and the output terminal of the second operational amplifier U2 is connected with the regulator.

Currents I1 and I2 of the two LED output circuits satisfy the following equation: I1×Rs1=I2×Rs1'. Since both the first slide rheostat Rs1 in the first LED output circuit and the second slide rheostat Rs1' in the second LED output circuit are adjustable resistors, if there is a need to adjust the ratio between currents of the two LED output circuits, it just needs to adjust resistances of Rs1 and Rs1'. The specific adjustment way may be to adjust resistance of one of Rs1 and Rs1', or may be to adjust resistance of both Rs1 and Rs1'. The specific principle is the same as that of the circuit shown in FIG. 5, which will not be described in detail herein.

Figure 7:
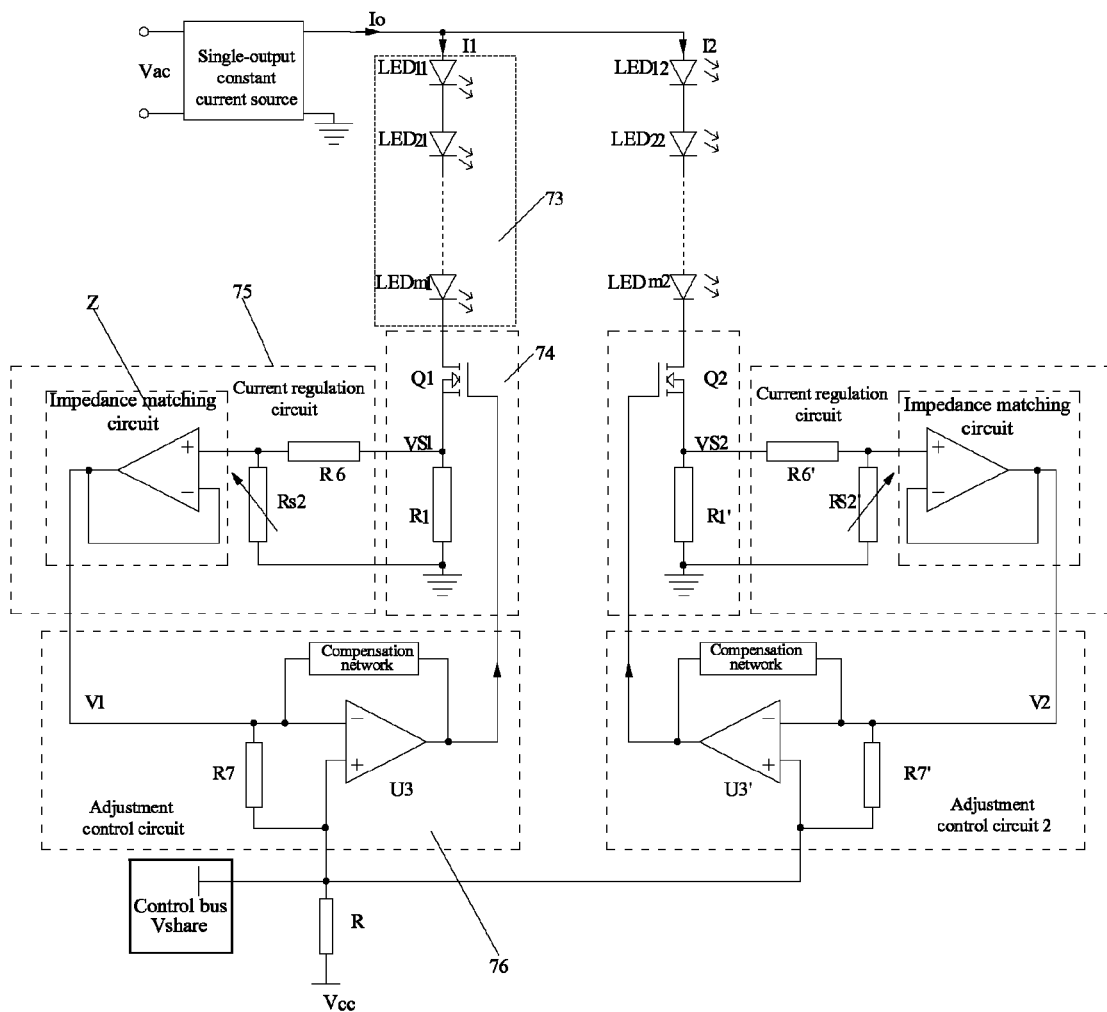
FIG. 7 is a schematic diagram showing yet another structure of the circuit for adjusting current of a LED according to an embodiment of the present invention.

A schematic diagram showing yet another structure of the circuit for adjusting current of a LED according to an embodiment of the present invention is shown in FIG. 7. This embodiment also takes a case of two LED output circuits having the same structure as an example. The structure of one of the two LED output circuits includes a load circuit 73, an adjustment circuit 74, a current regulation circuit 75 and an adjustment control circuit 76, where the regulator 741 is an n-channel enhancement-mode MOS transistor and the current sampling circuit 742 is a first resistor R1.

The current regulation circuit 75 in this embodiment includes a sixth resistor R6 and a second adjustable resistor Rs2. One terminal of the sixth resistor R6 is connected with a high level terminal of the first resistor R1, and the other terminal of the sixth resistor R6 is connected with the input terminal of the adjustment control circuit; one terminal of the second adjustable resistor Rs2 is connected with the input terminal of the adjustment control circuit, and the other terminal of the second adjustable resistor Rs2 is connected with a low level terminal of the first resistor R1.

Further, the current regulation circuit 75 further includes an impedance matching circuit Z, through which the sixth resistor R6 and the second adjustable resistor Rs2 are connected with the input terminal of the adjustment control circuit. The impedance matching circuit Z in this embodiment is a voltage follower consisting of an operational amplifier, an inverting input terminal of the operational amplifier is connected with an output terminal thereof, a non-inverting input terminal of the operational amplifier is connected to a common connection point of the sixth resistor R6 and the second adjustable resistor Rs2, and the output terminal of the operational amplifier is connected with the input terminal of the adjustment control circuit.

Further, the adjustment control circuit includes a seventh resistor R7, a third operational amplifier U3 and a compensation network N. The seventh resistor is connected in parallel between an inverting input terminal and a non-inverting input terminal of the third operational amplifier U3; the compensation network is connected in parallel between the inverting input terminal and an output terminal of the third operational amplifier U3; the output terminal of the third operational amplifier U3 is connected with the regulator; the non-inverting input terminal of the third operational amplifier U3 is connected with the control bus; and the inverting input terminal of the third operational amplifier U3 is connected with the output terminal of the current regulation circuit.

In the circuit shown in FIG. 7, a voltage obtained after the voltage drop Vs1 of the first resistor R1 is divided by the sixth resistor R6 and the second adjustable resistor Rs2 is inputted to the impedance matching circuit; and the output terminal of the impedance matching circuit is connected to the adjustment control circuit. When the resistance of the second adjustable resistor Rs2 is changed, the voltage drop of the second adjustable resistor Rs2 divided from Vs1 is changed, and the output signal V1 of the impedance matching circuit is changed correspondingly. After the output signal V1 of the impedance matching circuit and the total control signal Vshare are compared in the adjustment control circuit, a signal is output to the adjustment circuit to control the impedance of the regulator, and thereby current magnitude for this LED output circuit is adjusted.

Currents I1 and I2 of the two LED output circuits shown in the Figure satisfy the following equation:

$$\frac{I1 \times Rs2 \times R1}{R6 + Rs2} = \frac{I2 \times Rs2' \times R1'}{Rs2' + R6'} \tag{4}$$

If it there is a need to adjust the ratio between currents of the two LED output circuits, it just needs to adjust the resistance of the second adjustable resistor in each LED output circuit.

In this embodiment, the second adjustable resistor Rs2 may be a linear regulator with variable impedance, such as a MOS transistor and a transistor, where a grid of the MOS transistor or a base of the transistor is connected to an external voltage, the impedance of the linear regulator is adjusted by adjusting the voltage, thereby adjusting the current magnitude of the LED output circuit.

In this embodiment, it is not necessary to include the impedance matching circuit, and the impedance matching circuit can be omitted when there is no impedance mismatch in the circuit, which makes the structure of the circuit simpler.

In this embodiment, there is no limitation that the current regulation circuit disclosed by this embodiment should be applied only in this embodiment, and the current regulation circuit can be used in conjunction with an adjustment control circuit having any structure.

In this embodiment, the number of the LED output circuits is not limited to two, there may be more LED output circuits. According to the specific number of the LED output circuits, the equation described above can be adjusted correspondingly to achieve the purpose of determining the control signal Vshare according to all LED output circuits.

Figure 8:
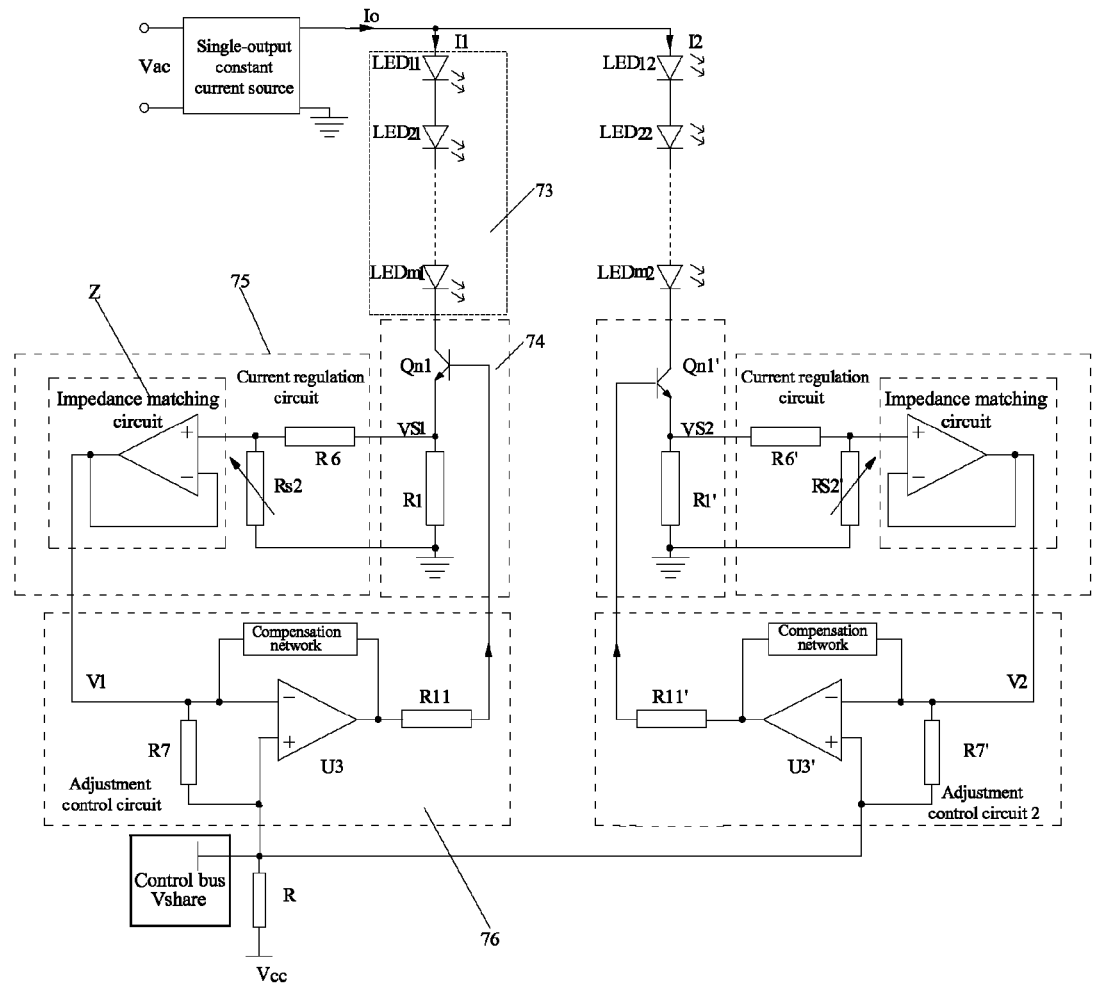
FIG. 8 is a schematic diagram showing yet another structure of the circuit for adjusting current of a LED according to an embodiment of the present invention.

Further, the regulator in this embodiment may be an n-channel enhancement-mode MOS transistor, or may be an NPN transistor. The adjustment control circuit is based on that shown in FIG. 7. As shown in FIG. 8, the regulator is a first NPN transistor Qn1. In this case, since the transistor is a current driven transistor, the adjustment control circuit further includes an eleventh resistor R11 connected between the output terminal of the third operational amplifier U3 and a base of the first NPN transistor Qn1, to convert a voltage value output from the adjustment control circuit into a current value, the operating principle thereof is the same as the principle of the circuit shown in FIG. 7.

In this embodiment, there is no limitation that the structure of the adjustment control circuit described above should be applied just in the circuit shown in FIG. 7. It may also be applied in any circuit which adopts an NPN transistor as the regulator to adjust current of a LED according to the present invention, and the current regulation circuit and the current sampling circuit may not be limited to those shown in FIG. 7.

Figure 9:
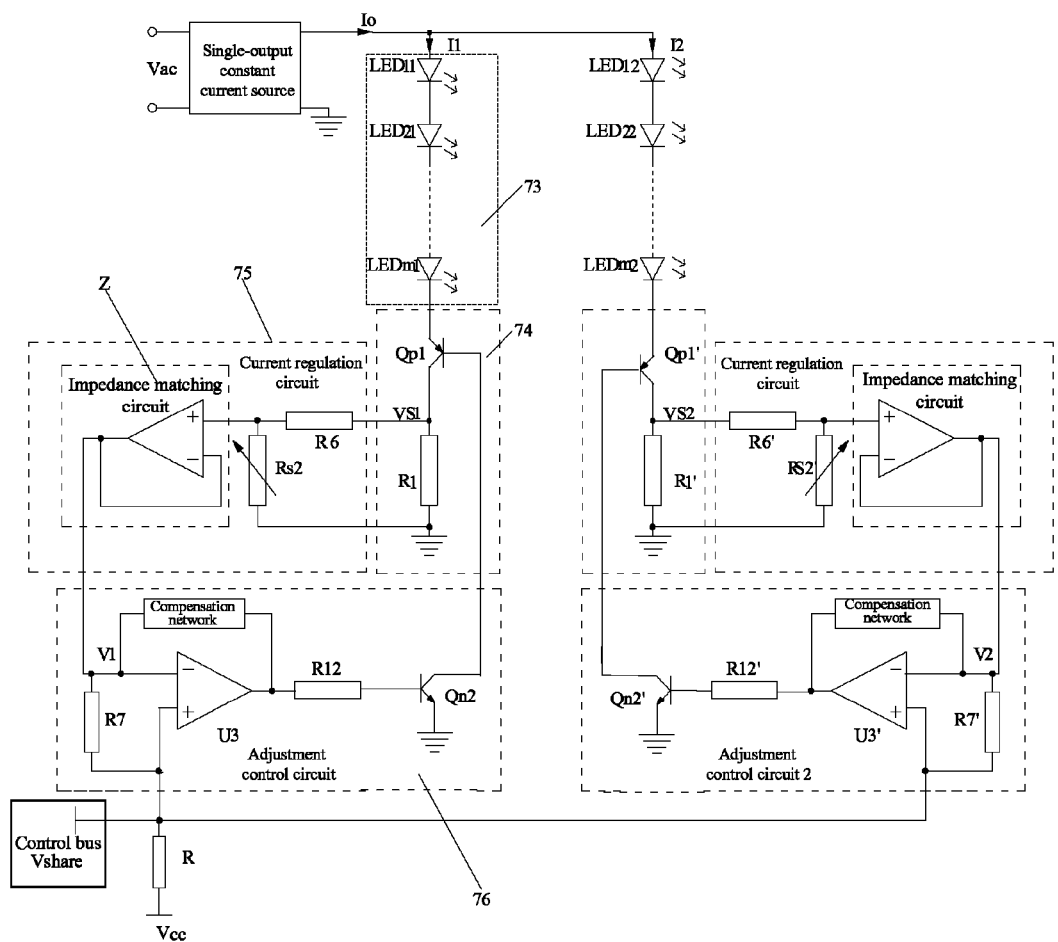
FIG. 9 is a schematic diagram showing yet another structure of the circuit for adjusting current of a LED according to an embodiment of the present invention.

Similarly, the regulator may also be a PNP transistor, the circuit structure of which is shown in FIG. 9. The regulator is a first PNP transistor Qp1, the adjustment control circuit is based on that shown in FIG. 7 and further includes a twelfth resistor R12 and a second NPN transistor Qn2. One terminal of the twelfth resistor R12 is connected to the output terminal of the third operational amplifier U3 and the other terminal of the twelfth resistor R12 is connected to a base of the second NPN transistor Qn2; a collector of the second NPN transistor Qn2 is connected with the base of the first PNP transistor Qp1, and an emitter of the second NPN transistor Qn2 is connected to the reference ground. The larger the output signal of the third operational amplifier U3 is, the smaller the on-impedance of the second NPN transistor Qn2 is; and the larger the base current of the first PNP transistor Qp1 is, the smaller the on-impedance of the first PNP transistor Qp1 is.

In this embodiment, there is no limitation that the structure of the adjustment control circuit described above should be applied just in the circuit shown in FIG. 7. It may also be applied in any circuit which adopts a PNP transistor as the regulator to adjust current of a LED according to the present invention, and the current regulation circuit and the current sampling circuit may not be limited to those shown in FIG. 7.

Figure 10:
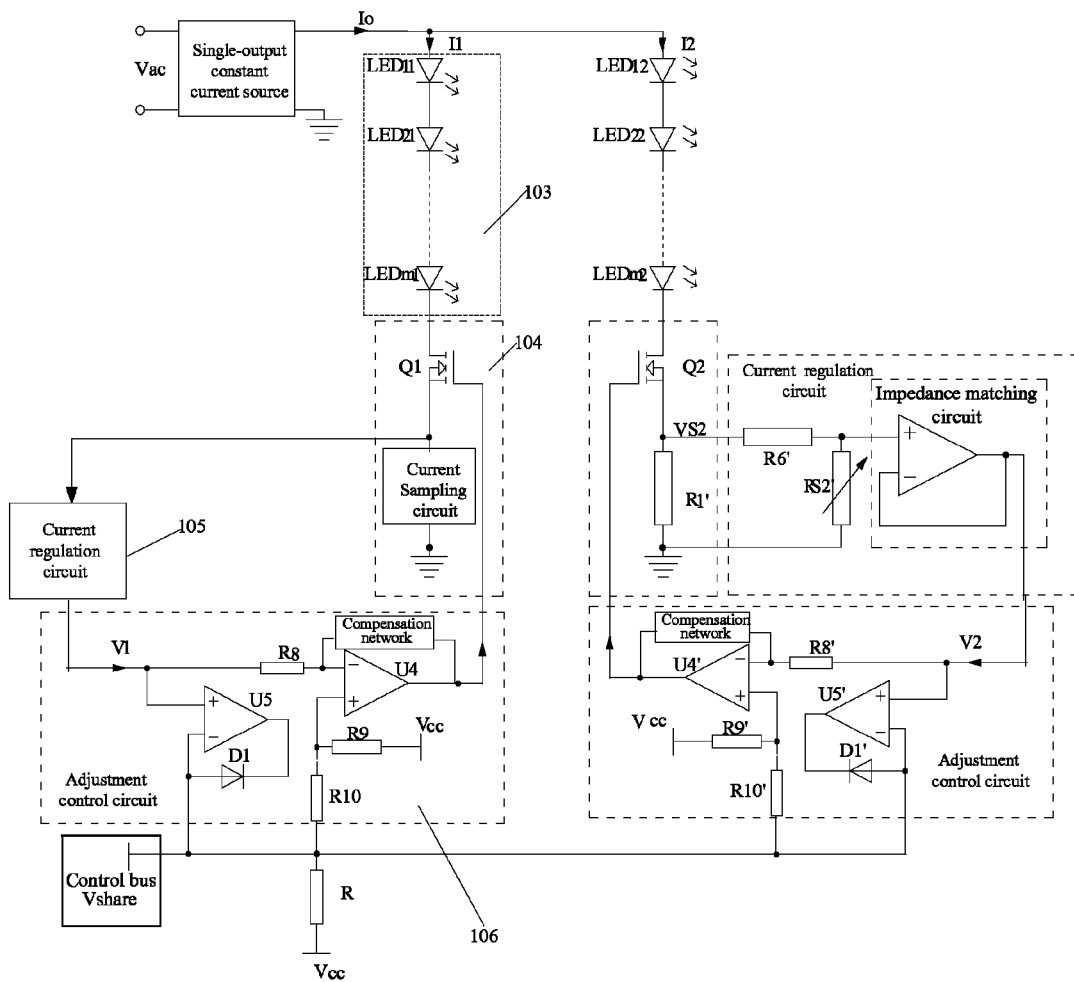
FIG. 10 is a schematic diagram showing yet another structure of the circuit for adjusting current of a LED according to an embodiment of the present invention.

A schematic diagram showing yet another structure of the circuit for adjusting current of a LED according to an embodiment of the present invention is shown in FIG. 10. Similarly, this embodiment also takes a case of two LED output circuits as an example, and the structure of one of the two LED output circuits includes a load circuit 103, an adjustment circuit 104, a current regulation circuit 105 and an adjustment control circuit 106. By taking one of the two LED output circuits as an example, the adjustment control circuit 106 includes an eighth resistor R8, a ninth resistor R9, a tenth resistor R10, a diode D1, a fourth operational amplifier U4, a fifth operational amplifier U5 and a compensation network. One terminal of the eighth resistor R8 is connected with the output terminal of the current regulation circuit, and the other terminal of the eighth resistor R8 is connected with an inverting input terminal of the fourth operational amplifier U4. One terminal of the ninth resistor R9 is connected with a non-inverting input terminal of the fourth operational amplifier U4, and the other terminal of the ninth resistor R9 is connected with the power supply Vcc. The non-inverting input terminal of the fourth operational amplifier U4 is connected with the control bus via the tenth resistor R10. The compensation network is connected in parallel between the inverting input terminal and an output terminal of the fourth operational amplifier U4. The output terminal of the fourth operational amplifier U4 is connected with the regulator. A non-inverting input terminal of the fifth operational amplifier U5 is connected with the output terminal of the current regulation circuit, an inverting input terminal of the fifth operational amplifier U5 is connected with the control bus. The diode D1 is connected in parallel between the inverting input terminal and an output terminal of the fifth operational amplifier U5, an anode of the diode D1 is connected to the inverting input terminal of the fifth operational amplifier U5, and a cathode of the diode D1 is connected to the output terminal of the fifth operational amplifier U5.

In the LED output circuits disclosed in this embodiment, the output signals of the current regulation circuits in the first LED output circuit and the second LED output circuit in the two LED output circuits are referred to as V1 and V2 respectively. In the first LED output circuit: when V1 is larger than Vshare and the output terminal of the fifth operational amplifier U5 outputs a high level, the diode D1 is not in a turning-on state, the Vshare remains unchanged; and when V1 is smaller than Vshare, the output terminal of the fifth operational amplifier U5 outputs a low level, the diode D1 is turned on, and at this time, the fifth operational amplifier U5 functions as a voltage follower, and Vshare becomes V1. In the other LED output circuit: when V2 is larger than Vshare, the output terminal of the fifth operational amplifier U5' outputs a high level, the diode D1' is not in a turning-on state, Vshare remains unchanged; and when V2 is smaller than Vshare, the output terminal of the fifth operational amplifier U5' outputs a low level, the diode D1' is turned on, and at this time, the fifth operational amplifier U5' becomes a voltage follower, and Vshare becomes V2. Therefore, it can be seen that, the fifth operational amplifier U5 and the diode D1 form a minimum voltage selecting circuit to ensure that Vshare=Min (V1, V2), and then Vshare is compared with the output signal (V1, V2) of the current regulation circuit in each LED output circuit. If the output signal of the current regulation circuit in a certain LED output circuit is larger than the total control signal Vshare, then the output voltage of the operational amplifier decreases gradually, such that the regulator of this LED output circuit may operate in a linear state, and current of the LEDs may be decreased gradually until it is close to Vshare. When the current in each LED output circuit reaches a stable state after adjustment, due to a biasing effect of the ninth resistor R9, the voltage of the non-inverting input terminal of the fourth operational amplifier U4 is always slightly larger than the voltage of the inverting input terminal of the fourth operational amplifier U4, thereby the voltage of the output terminal of the fourth operational amplifier U4 is raised, and the adjustment resistor in the LED output circuit having the largest voltage drop of LED load is in a saturated conduction state, and at this time, the output voltage of the single-output constant current source is equal to or close to the voltage drop of LED load in this LED output circuit, and impedances of the regulators in other LED output circuits are also reduced. Therefore, after the control bus Vshare is connected to Vcc via the ninth resistor R9 for biasing, power consumption of the adjustment resistor in each LED output circuit is reduced, thus improving efficiency of this embodiment.

When the circuit starts up, the input signal Vshare of the inverting input terminal of the fifth operational amplifier U5 is 0, and the input signal V1 of the non-inverting input terminal of the fifth operational amplifier U5 is also 0, it is unable to operate normally in this case. In order to solve this problem, the total control signal Vshare of the control bus is connected to Vcc via a resistor R, so as to ensure that Vshare is not 0 at the beginning and the circuit may operate normally.

The structures of the current sampling circuit and the current regulation circuit in this embodiment may be the structures shown in any of the above figures. Also, the structures of the two LED output circuits disclosed in this embodiment may be different. As shown in FIG. 10, the structures of the current regulation circuit and the current sampling circuit in the second LED output circuit may be those shown in FIG. 9, while the structures of the current sampling circuit and the current regulation circuit in the first LED output circuit are not limited and may be the same as or different from that of the second LED output circuit.

Figure 11:
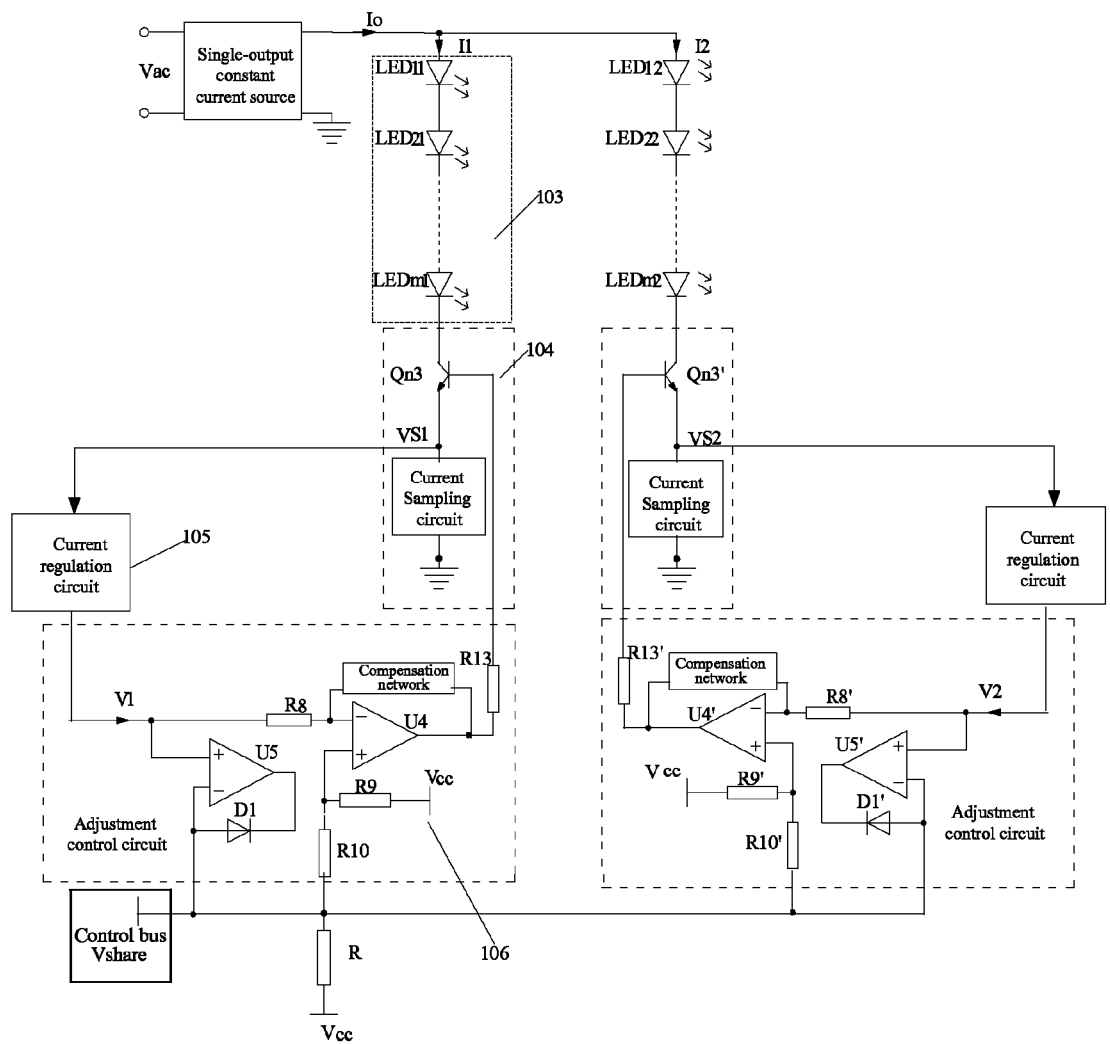
FIG. 11 is a schematic diagram showing yet another structure of the circuit for adjusting current of a LED according to an embodiment of the present invention.

The regulator in this embodiment is an n-channel enhancement-mode MOS transistor, and it may also be an NPN transistor. In this case, the circuit structure is shown in FIG. 11, the regulator is a third NPN transistor Qn3, the adjustment control circuit further includes a thirteenth resistor R13 connected between the output terminal of the fourth operational amplifier U4 and a base of the third NPN transistor Qn3, to convert the output voltage signal into a current signal, thereby achieving control to the third NPN transistor Qn3.

Figure 12:
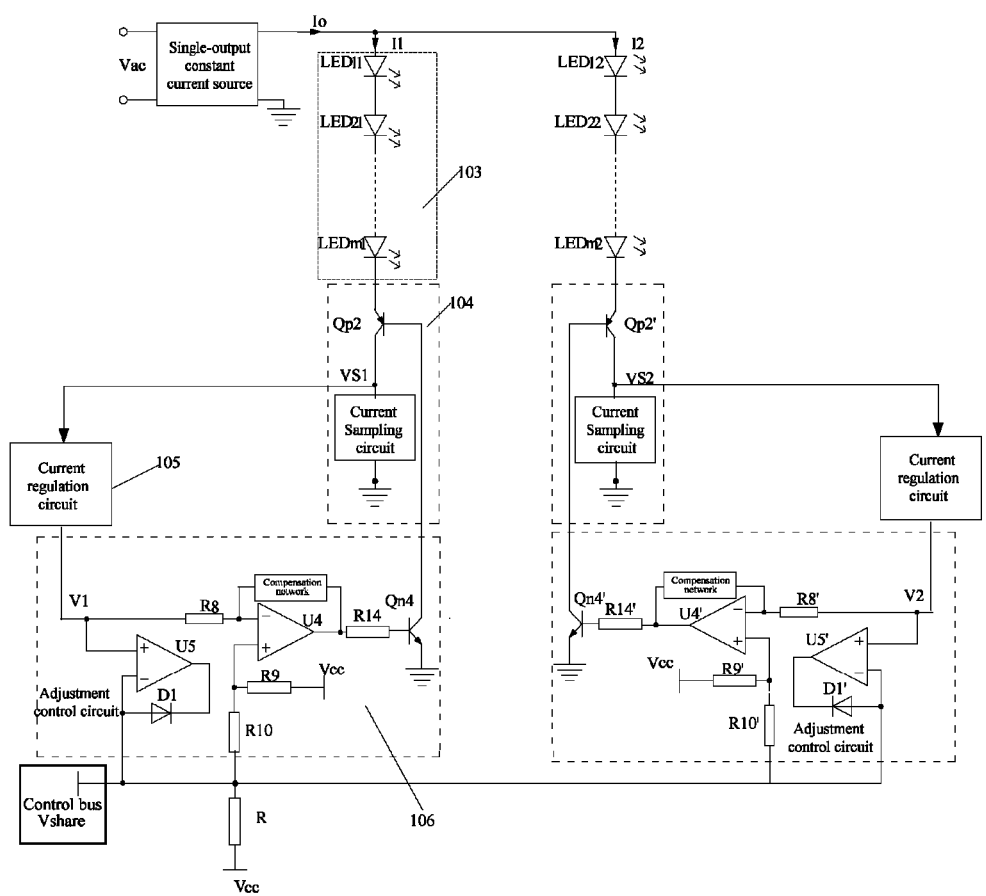
FIG. 12 is a schematic diagram showing yet another structure of the circuit for adjusting current of a LED according to an embodiment of the present invention.

The regulator may also be a PNP transistor, the circuit structure of which is shown in FIG. 12, the regulator is a second PNP transistor Qp2, and in this case, the adjustment control circuit further includes a fourteenth resistor R14 and a fourth NPN transistor Qn4. One terminal of the fourteenth resistor R14 is connected to the output terminal of the fourth operational amplifier U4 and the other terminal of the fourteenth resistor R14 is connected to a base of the fourth NPN transistor Qn4. A collector of the fourth NPN transistor Qn4 is connected with a base of the second PNP transistor Qp2, and an emitter of the fourth NPN transistor Qn4 is connected to the reference ground. The larger the output signal of the fourth operational amplifier U4 is, the smaller the on-impedance of the fourth PNP transistor Qp2 is; and the larger the base current of the third PNP transistor Qp1 is, the smaller the on-impedance of the third PNP transistor Qp1 is.

The embodiments of the present invention are described in a progressive manner, with the emphasis of each of the embodiments on the difference between it and the other embodiments; hence, for the same or similar parts between the embodiments, one can refer to the other embodiments. For the device disclosed in the embodiments, since it corresponds to the method disclosed in the embodiments, the description thereof is relatively simple, thus for the related parts, one can refer to the description of the method section.

The description of the embodiments herein enables those skilled in the art to implement or use the present invention. Numerous modifications to the embodiments will be apparent to those skilled in the art, and the general principle herein can be implemented in other embodiments without deviation from the spirit or scope of the present invention. Therefore, the present invention will not be limited to the embodiments described herein, but in accordance with the widest scope consistent with the principle and novel features disclosed herein.

The invention claimed is:

1. A circuit for adjusting current of a light-emitting diode (LED), comprising: a single-output constant current source, a plurality of LED output circuits and a control bus connected with the plurality of LED output circuits, each of the plurality of LED output circuits comprising a load circuit, an adjustment circuit, a current regulation circuit and an adjustment control circuit, wherein:

the load circuit comprises a plurality of LEDs connected in series, one terminal of the load circuit is connected with a first output terminal of the single-output constant current source, and the other terminal of the load circuit is connected with an input terminal of the adjustment circuit;

the adjustment circuit comprises an regulator connected with the load circuit and a current sampling circuit, one terminal of the current sampling circuit is connected with the regulator, and the other terminal of the current sampling circuit is connected with a second output terminal of the single-output constant current source, and an output terminal of the adjustment circuit is connected with an input terminal of the current regulation circuit;

an output terminal of the current regulation circuit is connected with a first input terminal of the adjustment control circuit, and the current regulation circuit makes, as required, some adjustments to a sampled-current output from the adjustment circuit such that the sampled-current is converted into a control signal corresponding to the sampled-current, and the control signal is output to the adjustment control circuit; and a second input terminal of the adjustment control circuit is connected with the control bus and an output terminal of the adjustment control circuit is connected with the regulator, the adjustment control circuit compares the control signal with a voltage of the control bus, and adjusts impedance of the regulator according to the comparison result, so as to achieve adjustment for current of this LED output circuit; and the current regulation circuit comprises a second resistor, one terminal of the second resistor is connected with the output terminal of the adjustment circuit, and the other terminal of the second resistor is connected with a first switch and an input terminal of a filter circuit respectively, the other terminal of the first switch is connected to ground, the first switch is turned on or off under the control of a pulse signal, and an output terminal of the filter circuit is connected with the input terminal of the adjustment control circuit.

2. The circuit according to claim 1, wherein the current sampling circuit is a first resistor.

3. The circuit according to claim 1, wherein the filter circuit comprises a third resistor, a fourth resistor, a first capacitor, a first operational amplifier and a second capacitor, one terminal of the third resistor is connected with the second resistor, the other terminal of the third resistor is connected with the first capacitor and the fourth resistor respectively, the other terminal of the capacitor is connected with an inverting input terminal of the first operational amplifier, the other terminal of the fourth resistor is connected with a non-inverting input terminal of the first operational amplifier, the non-inverting input terminal of the first operational amplifier and the fourth resistor are connected to ground via the second capacitor, the inverting input terminal of the first operational amplifier is connected with an output terminal thereof, and the output terminal of the first operational amplifier is connected with the input terminal of the adjustment control circuit.

4. The circuit according to claim 1, wherein the adjustment control circuit comprises a fifth resistor, a second operational amplifier and a compensation network, one terminal of the fifth resistor is connected with the output terminal of the current regulation circuit, and the other terminal of the fifth resistor is connected with the control bus;

an inverting input terminal of the second operational amplifier is connected with the output terminal of the current regulation circuit, and a non-inverting input terminal of the second operational amplifier is connected with the control bus;

the compensation network is connected in parallel between the inverting input terminal and an output terminal of the second operational amplifier; and the output terminal of the second operational amplifier is connected with the regulator.

5. A circuit for adjusting current of a light-emitting diode (LED), comprising: a single-output constant current source, a plurality of LED output circuits and a control bus connected with the plurality of LED output circuits, each of the plurality LED output circuits comprising a load circuit, an adjustment circuit, a current regulation circuit and an adjustment control circuit, wherein:

the load circuit comprises a plurality of LEDs connected in series, one terminal of the load circuit is connected with a first output terminal of the single-output constant current source, and the other terminal of the load circuit is connected with an input terminal of the adjustment circuit;

the adjustment circuit comprises a regulator connected with the load circuit and a current sampling circuit, one terminal of the current sampling circuit is connected with the regulator, and the other terminal of the current sampling circuit is connected with a second output terminal of single-output constant current source, and an output terminal of the adjustment circuit is connected with an input terminal of the current regulation circuit;

an output terminal of he current regulation circuit is connected with a first input terminal of the adjustment control circuit, and the current regulation circuit makes, as required, some adjustments to a sampled-current output from the adjustment circuit such that the sampled-current is converted into a control signal corresponding to the sampled-current, and the control signal is output to the adjustment control circuit;

a second input terminal of the adjustment control circuit is connected with the control bus and an output terminal of the adjustment control circuit is connected with the regulator, the adjustment control circuit compares the control signal with a voltage of the control bus, and adjusts impedance of the regulator according to the comparison result, so as to achieve adjustment for current of this LED output circuit; the current sampling circuit is a first resistor; and the current regulation circuit comprises a sixth resistor and a second adjustable resistor:

one terminal of the sixth resistor is connected with a high level terminal of the first resistor, and the other terminal of the sixth resistor is connected with the input terminal of the adjustment control circuit; and one terminal of the second adjustable resistor is connected with the input terminal of the adjustment control circuit, and the other terminal of the second adjustable resistor is connected with a low level terminal of the first resistor.

6. The circuit according to claim 5, wherein the current regulation circuit further comprises an impedance matching circuit, the impedance matching circuit is a voltage follower consisting of an operational amplifier, an inverting input terminal of the operational amplifier is connected with an output terminal thereof, a non-inverting input terminal of the operational amplifier is connected to a common connection point of the sixth resistor and the second adjustable resistor, and the output terminal of the operational amplifier is connected with the input terminal of the adjustment control circuit.

7. The circuit according to claim 1, wherein the adjustment control circuit comprises an eighth resistor, a ninth resistor, a tenth resistor, a diode, a fourth operational amplifier, a fifth operational amplifier and a compensation network, one terminal of the eighth resistor is connected with the output terminal of the current regulation circuit, and the other terminal of the eighth resistor is connected with an inverting input terminal of the fourth operational amplifier;

one terminal of the ninth resistor is connected with a non-inverting input terminal of the fourth operational amplifier, and the other terminal of the ninth resistor is connected with a power supply;

the non-inverting input terminal of the fourth operational amplifier is connected with the control bus via the tenth resistor;

the compensation network is connected in parallel between the inverting input terminal and an output terminal of the fourth operational amplifier;

the output terminal of the fourth operational amplifier is connected with the regulator;

a non-inverting input terminal of the fifth operational amplifier is connected with the output terminal of the current regulation circuit;

an inverting input terminal of the fifth operational amplifier is connected with the control bus; and an anode of the diode is connected to the inverting input terminal of the fifth operational amplifier, and a cathode of the diode is connected to an output terminal of the fifth operational amplifier.

8. The circuit according to claim 1, wherein the regulator is an n-channel enhancement-mode MOS (metal oxide semiconductor) transistor, a drain of the MOS transistor is connected with the load circuit, a source of the MOS transistor is connected with the input terminal of the current sampling circuit, and a grid of the MOS transistor is connected with the output terminal of the adjustment control circuit.

9. The circuit according to claim 4, wherein, in the case where the regulator is a first NPN transistor, a collector of the is connected with the load circuit, an emitter of the is connected with the input terminal of the current sampling circuit, and a base of the first NPN transistor is connected with the output terminal of the adjustment control circuit; and the adjustment control circuit further comprises an eleventh resistor connected between an output terminal of a third operational amplifier and the base of the first NPN transistor; and in the case where the regulator is a first PNP transistor, an emitter of the is connected with the load circuit, a collector of the is connected with the input terminal of the current sampling circuit, and a base of the is connected with the output terminal of the adjustment control circuit; and the adjustment control circuit further comprises a twelfth resistor and a second NPN transistor, one terminal of the twelfth resistor is connected to the output terminal of the third operational amplifier and the other terminal of the twelfth resistor is connected to a base of the second NPN transistor, a collector of the second NPN transistor is connected with the base of the first PNP transistor, and an emitter of the second NPN transistor is connected to ground.

10. The circuit according to claim 7, wherein, in the case where the regulator is a third NPN transistor, a collector of the is connected with the load circuit, an emitter of the is connected with the input terminal of the current sampling circuit, and a base of the is connected with the output terminal of the adjustment control circuit; and the adjustment control circuit further comprises a thirteenth resistor connected between the output terminal of the fourth operational amplifier and the base of the third NPN transistor; and in the case where the regulator is a second PNP transistor, an emitter of the is connected with the load circuit, a collector of the is connected with the input terminal of the current sampling circuit, and a base of the is connected with the output terminal of the adjustment control circuit; and the adjustment control circuit further comprises a fourteenth resistor and a fourth NPN transistor, one terminal of the fourteenth resistor is connected to the output terminal of the fourth operational amplifier and the other terminal of the fourteenth resistor is connected to a base of the fourth NPN transistor, a collector of the fourth NPN transistor is connected with the base of the second PNP transistor, and an emitter of the fourth NPN transistor is connected to ground.

11. The circuit according to claim 1, wherein the control bus is connected with a power supply via a resistor.

12. The circuit according to claim 1, wherein in the plurality of LED output circuits, LED lamps in different LED output circuits are LED lamps with different colors or white light LED lamps with different color temperatures.

13. The circuit according to claim 1, wherein output current of the single-output constant current source is adjustable, and brightness of a light source consisting of the LEDs changes as the output current of the single-output constant current source changes.

14. The circuit according to claim 1, wherein the regulator is an n-channel enhancement-mode MOS (metal oxide semiconductor) transistor, a drain of the MOS transistor is connected with the load circuit, a source of the MOS transistor is connected with the input terminal of the current sampling circuit, and a grid of the MOS transistor is connected with the output terminal of the adjustment control circuit.

15. The circuit according to claim 2, wherein the regulator is an n-channel enhancement-mode MOS (metal oxide semiconductor) transistor, a drain of the MOS transistor is connected with the load circuit, a source of the MOS transistor is connected with the input terminal of the current sampling circuit, and a grid of the MOS transistor is connected with the output terminal of the adjustment control circuit.

16. The circuit according to claim 1, wherein the regulator is an n-channel enhancement-mode MOS (metal oxide semiconductor) transistor, a drain of the MOS transistor is connected with the load circuit, a source of the MOS transistor is connected with the input terminal of the current sampling circuit, and a grid of the MOS transistor is connected with the output terminal of the adjustment control circuit.

17. The circuit according to claim 3, wherein the regulator is an n-channel enhancement-mode MOS (metal oxide semiconductor) transistor, a drain of the MOS transistor is connected with the load circuit, a source of the MOS transistor is connected with the input terminal of the current sampling circuit, and a grid of the MOS transistor is connected with the output terminal of the adjustment control circuit.

18. The circuit according to claim 4, wherein the regulator is an n-channel enhancement-mode MOS (metal oxide semiconductor) transistor, a drain of the MOS transistor is connected with the load circuit, a source of the MOS transistor is connected with the input terminal of the current sampling circuit, and a grid of the MOS transistor is connected with the output terminal of the adjustment control circuit.

* * * * *